Aug. 9, 1966  C. F. ERIKSON  3,264,905

MACHINE TOOLS

Filed April 23, 1963

INVENTOR.
Carl F. Erikson
BY
Hofgren, Wegner, Allen, Stellman & McCord
Atty's

United States Patent Office 3,264,905
Patented August 9, 1966

3,264,905
MACHINE TOOLS
Carl F. Erikson, Belvidere, Ill., assignor to Sundstrand Corporation, a corporation of Illinois
Filed Apr. 23, 1963, Ser. No. 275,078
5 Claims. (Cl. 77—3)

This invention relates to machine tools and more particularly to mechanism for providing more accurate machining by providing mechanism for variably counterbalancing and prestressing components of the machine tool.

An object of this invention is to provide a new and improved machine tool in which a variable counterbalancing device is provided to counteract variable forces encountered by location of a spindle head at different elevations on a supporting column.

Another object of this invention is to provide a machine tool in which mechanism is provided to align a pair of spaced apart ways and to bring the ways to absolute straightness or provide some deflection therein as required by the load supported by the ways.

Still another object of the invention is to provide, in a machine tool, pre-stress mechanism for pre-stressing a way structure to counteract the effect of overhanging weight supported on the way structure which normally tends to deflect the way structure downwardly and to place compression on supporting bearings whereby straight line movement along the way structure will result.

A further object of the invention is to provide a machine tool with spaced apart ways for supporting a movable component of the machine tool and means associated with the ways for either making the ways accurately straight or placing stress thereon to provide nominal straightness of movement of another component along the ways.

Further objects and advantages will become apparent from the following detailed description taken in connection with the accompanying drawings in which.

Figures 1, 2, 3:
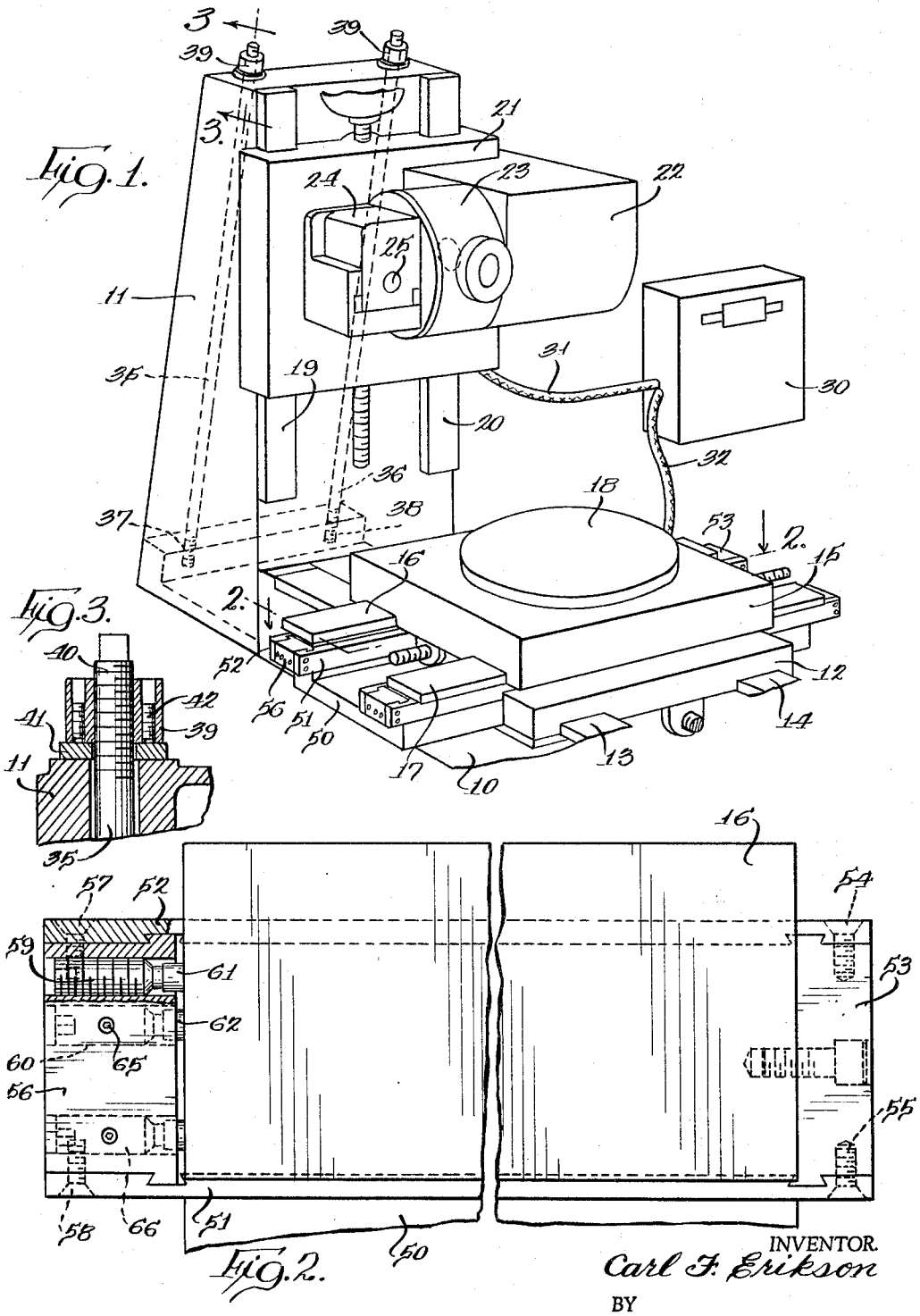
FIG. 1 is a perspective view of a machine tool.
FIG. 2 is a fragmentary plan view taken along the line 2—2 in FIG. 1 on an enlarged scale with parts broken away.
FIG. 3 is a fragmentary section taken along the line 3—3 in FIG. 1.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiments illustrated. The scope of the invention will be pointed out in the appended claims.

The machine tool disclosed herein is of the type disclosed in the prior application of Fred R. Swanson and Carl F. Erikson, United States Serial No. 162,148, filed December 26, 1961, and reference may be had thereto for more specific details of the machine tool. Generally, this machine tool has a bed 10, with a column 11, upstanding therefrom at the rear thereof, with a cross-saddle 12 mounted on bed ways 13 and 14 for movement toward and away from the column 11. A table 15 is mounted on the cross-saddle 12 for movement along an axis normal to the axis of movement of the cross-saddle. The cross-saddle has ways 16 and 17 on which the table moves with the table being freely movable thereon by means of ball bearing packages as shown in my pending application, Serial No. 240,065, filed November 26, 1962, and now abandoned. The table 15 carries a rotary table 18, which can rotate about an upright axis. This rotary table carries a workpiece and the workpiece can be positioned at any desired orientation relative to a tool by movements of the cross-saddle 12, the table 15 and the rotary table 18.

The column 11 has a pair of generally vertical ways 19 and 20 on which a vertical slide 21 is movably mounted. The vertical slide carries a transmission unit 22, with this unit supporting a spindle head 23 for rotative adjustment. An axially movable spindle head 24 is supported on the spindle head 23 and has a spindle 25 for supporting a tool which moves axially.

The machine tool can be numerically controlled from a commercially available numerical control system, indicated generally at 30, which includes a tape reader or other data receiving means and through lines 31 and 32 controls the drive mechanisms for the various components to position the parts as required.

With the present requirements for accuracy in connection with numerically controlled machine tools, accuracies must be obtained approximately .0001″. These strict requirements have necessitated careful consideration of deflections induced in parts of the machine tool, due to variably positioned masses and also consideration of initial manufacturing accuracies.

For example, the slide 21, movable on the column ways 19 and 20, may have many different positions along the column and thus different bending moments are induced at different elevations of the slide. In order to counterbalance these bending forces, a pair of counterbalancing members 35 and 36 in the form of rods are positioned adjacent the rear of the column with the rod 35 in front to rear alignment with the way 19 and the rod 36 in similar alignment with the way 20. These rods are suitably secured at their lower ends, as by threading, to the base of the column, as indicated at 37 and 38, respectively. The rods at their upper ends extend above the top of the column and have a sleeve 39 threaded onto threads 40 on the rod and spaced from the top of the column by a wear plate 41. The sleeve has a series of set screws 42 threaded therein and which abut against the wear plate 41. With this structure, suitable stress can be placed on the rods 35 and 36 to provide a controllable variable and counteract different bending forces at different elevations of the slide 21. This provides for nominal straightness of movement of the slide 21 along the ways by applying pre-stress to the column and resisting deflections in the column, particularly when the slide is near the upper part of its path of travel. This structure additionally can function to render the ways 19 and 20 more nearly straight if they should initially have some concavity thereto.

With the two rods 35 and 36, it is also possible to adjust for any lateral misalignment between the two ways 19 and 20 by adjustment of one of the rods relative to the other.

Another utilization of this concept is shown in connection with the cross-saddle ways 16 and 17. As seen in FIG. 1, a body 50 of the cross-saddle has the ways 16 and 17 at the top thereof, with each of the ways having an outwardly extending overhang.

A pair of straps 51 and 52 are associated with each way and extend along the body immediately beneath the way. As seen in FIG. 2, the straps at one end are connected by a block 53 having dovetail connection with the straps and the straps secured thereto by screws 54 and 55. This block 53 is threaded into an end of the cross-saddle body. The straps at their other ends are connected together by a block 56 having dovetail connection with the straps and with the straps being secured thereto by screws 57 and 58. The block 56 carries a pair of adjusting screws 59 and 60 which are threaded into openings within the block and engageable with their respective wear plates 61 and 62 engaging against the cross-saddle body. These adjusting screws 59 and 60 are located between the centerline of the way and the overhanging part thereof and can be advanced inwardly relative to the block to put a desired amount of tension in the straps 51 and 52 and a corresponding amount of compression in the body 50 of the cross-saddle near the ways 16 and 17.

The adjusting screws 59 and 60 can be held in their positions by a set screw associated with each of these adjusting screws. The set screw 65 for the adjusting screw 60 is shown in FIG. 2.

If there should be any lack of straightness in a way in the horizontal plane, then an additional adjusting screw 66 can be used, as indicated in FIG. 2.

In utilization of the straps 51 and 52, the table 15 can be moved on the cross-saddle ways and readings taken of the downward deflection resulting from deflection of the ways and also compression of the bearings. Then, the adjusting screws 59 and 60 can be moved inwardly to put a predetermined amount of compression on the way structure and obtain an upward deflection which counteracts the previously noted deflection.

Additionally, the rotary table 18 can handle workpieces of greatly different weights and if there is found to be a significant difference in the accuracy of positioning in handling these different weight workpieces, suitable adjustment of the pre-stressing straps can be made to maintain straight line movement of the workpiece.

I claim:

1. In a numerically controlled machine tool, a column having a pair of spaced apart ways, a slide mounted on said ways and having a spindle and spindle head positionable at different elevations on said column, and a pair of members extending for substantially the length of the the column and adjacent the rear thereof, each of said members being positioned generally in front to rear alignment with a respective one of said ways, and adjustable means operatively connecting each of said members to said column for stressing each of said members to a desired degree and placing corresponding compression on said column.

2. In a machine tool having movable elements, one of said elements having a body with a pair of spaced apart ways with outwardly extending overhangs for movably supporting another element, and way aligning means comprising a pair of straps disposed at both sides of said way, means anchoring one end of said straps to said body, a block at the other end of said straps connected therebetween, and adjusting screws threaded into said block and engageable with said body at an end thereof for placing said straps under tension and the body under compression to achieve operative straightness of said ways.

3. In a machine tool as defined in claim 2 in which said adjusting screws are located between the center of the way and the overhang, and means for using another adjusting screw at the opposite side of the way center as required to hold the way straight in a horizontal plane.

4. In a numerically controlled machine tool, a column having a pair of spaced apart ways, a slide mounted on said ways and positionable at different elevations on said column, and a pair of stress members extending for substantially the length of the column and adjacent the rear thereof, each of said stress members being positoned generally in front to rear alignment with a respective one of said ways and having one end rigidly fastened to the base of the column, and adjustable means operatively connecting each of said members to said column for stressing each of said members to a desired degree and placing corresponding compression on said column including sleeves secured to said stress rods at the upper ends thereof exposed above the column, and adjustable screws carried on said sleeves and engaging the column.

5. In a machine tool having movable elements, one of said elements having a body with a pair of spaced apart ways with outwardly extending overhangs for movably supporting another element, and way aligning means comprising a pair of straps disposed at both sides of said way, means anchoring one end of said straps to said body, connecting means at the other end of said straps connected therebetween, and adjustable means acting between said connecting means and an end of said body for placing said straps under tension and the body under compression to achieve operative straightness of said ways.

References Cited by the Examiner
UNITED STATES PATENTS

| | | | |
|---|---|---|---|
| 1,245,324 | 11/1917 | Droitcour | 308—3 |
| 2,912,905 | 11/1959 | Berthiez | 90—16 |

WILLIAM W. DYER, Jr., *Primary Examiner.*

FRANCIS S. HUSAR, *Examiner.*